United States Patent
Huang et al.

(10) Patent No.: US 11,522,621 B2
(45) Date of Patent: Dec. 6, 2022

(54) METHOD AND CIRCUIT FOR CALIBRATING WIRELESS TRANSCEIVER

(71) Applicant: REALTEK SEMICONDUCTOR CORPORATION, Hsinchu (TW)

(72) Inventors: Chien-Jung Huang, Hsinchu (TW); Yi-Hua Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/369,108

(22) Filed: Jul. 7, 2021

(65) Prior Publication Data

US 2022/0109513 A1 Apr. 7, 2022

(30) Foreign Application Priority Data

Oct. 5, 2020 (TW) ................... 109134433

(51) Int. Cl.
*H04B 17/00* (2015.01)
*H04B 17/11* (2015.01)
(Continued)

(52) U.S. Cl.
CPC ............. *H04B 17/11* (2015.01); *H04B 1/40* (2013.01); *H04B 17/21* (2015.01)

(58) Field of Classification Search
CPC .... H04B 17/101; H04B 17/102; H04B 17/11; H04B 17/21; H04B 1/04;
(Continued)

(56) References Cited

U.S. PATENT DOCUMENTS 6,959,178 B2 * 10/2005 Macedo ................. H04B 1/006
455/340
7,203,472 B2 4/2007 Seppinen et al.
(Continued)

FOREIGN PATENT DOCUMENTS

CN 101189804 A 5/2008
CN 104301047 A 1/2015
CN 108683409 A 10/2018

OTHER PUBLICATIONS

OA letter of the counterpart TW application (appl No. 109134433) mailed on Jun. 15, 2021. Summary of the OA letter (1) Claim(s) 1-4, 7, and 10 is/are rejected under Patent Law Article 22(2) as being unpatentable over reference 1 (US 2013/0122956A1) and reference 2 (CN 104301047B). (2) Claim(s) 5-6 and 8-9 is/are rejected under Patent Law Article 22(2) as being unpatentable over reference 1 (US 2013/0122956A1), reference 2 (CN 104301047B), and reference 3 (CN 101189804A).

*Primary Examiner* — Tuan Pham
(74) *Attorney, Agent, or Firm* — WPAT, PC

(57) ABSTRACT

The present invention discloses a calibration method and calibration circuit for a wireless transceiver. The wireless transceiver includes a transmission path and a reception path, and there is a mixer on the transmission path. The calibration method includes the following steps: (A) adjusting a first parameter of a first LC tank circuit of the mixer; (B) receiving a first input signal via a coupling path and the reception path; (C) measuring a first power of the first input signal; (D) repeating steps (A) to (C) to obtain multiple first powers; and (E) determining a first target parameter corresponding to a largest power of the first powers.

16 Claims, 5 Drawing Sheets

(51) Int. Cl.
*H04B 17/21* (2015.01)
*H04B 1/40* (2015.01)

(58) Field of Classification Search
CPC .... H04B 2001/0408; H04B 2001/0416; H04B 1/16; H04B 1/40; H04B 1/48
See application file for complete search history.

(56) References Cited

U.S. PATENT DOCUMENTS

| | | | | |
|---|---|---|---|---|
| 8,290,464 | B2* | 10/2012 | Bouillet | H04B 1/1036 |
| | | | | 455/296 |
| 2008/0233869 | A1* | 9/2008 | Baker | H03L 7/181 |
| | | | | 455/41.1 |
| 2013/0122956 | A1 | 5/2013 | Lee et al. | |
| 2021/0013975 | A1* | 1/2021 | Jacquet | H04B 17/12 |
| 2022/0174525 | A1* | 6/2022 | Dzierwa | H04W 24/08 |

* cited by examiner

METHOD AND CIRCUIT FOR CALIBRATING WIRELESS TRANSCEIVER

BACKGROUND OF THE INVENTION

1. Field of the Invention

The present invention generally relates to wireless transceivers, and, more particularly, to a method and a circuit for calibrating the wireless transceivers.

2. Description of Related Art

A wireless transceiver can operate in multiple bands, and there are multiple channels in one band. Wireless transceivers are usually designed to output the same power over various channels of the same band; that is, wireless transceivers are usually desired to be of high flatness.

In the design stage, the LC tank circuit of the radio frequency (RF) circuit of the wireless transceiver needs to be optimally adjusted to set the parameters (i.e., inductance and capacitance), so that the frequency response of the RF circuit has the best flatness. However, there are often process errors in mass production. If the process error exceeds the tolerance range of the parameters set during development, the flatness of the wireless transceiver will not be as desired.

One of the conventional solutions is to compensate for the deficiency of the RF power by increasing the power of the baseband circuit and/or the intermediate frequency (IF) circuit of the wireless transceiver. However, the baseband circuit and the IF circuit have their respective power upper bounds which are set in advance. Increasing the power of the baseband circuit or the IF circuit will reduce the linearity of the baseband circuit or the IF circuit, or even lead to saturation of the baseband circuit or the IF circuit. Both poor linearity and circuit saturation degrade the performance of the wireless transceiver.

SUMMARY OF THE INVENTION

In view of the issues of the prior art, an object of the present invention is to provide a method and a circuit for calibrating wireless transceivers, so as to enhance the flatness of the wireless transceivers.

A method of calibrating a wireless transceiver is provided. The wireless transceiver including a transmission path and a reception path. The transmission path includes a mixer. The method includes the following steps: (A) adjusting a first parameter of a first LC tank circuit of the mixer; (B) receiving a first input signal through a coupling path and the reception path; (C) measuring a first power of the first input signal; (D) repeating steps (A) to (C) to obtain a plurality of the first powers; and (E) determining a first target parameter corresponding to a largest power of the first powers.

A circuit for calibrating a wireless transceiver is also provided. The wireless transceiver includes a transmission path and a reception path. The transmission path includes a mixer. The circuit includes a memory and a control circuit. The control circuit is coupled to the memory and configured to perform the following steps: (A) adjusting a first parameter of a first LC tank circuit of the mixer; (B) receiving a first input signal through a coupling path and the reception path; (C) measuring a first power of the first input signal; (D) repeating steps (A) to (C) to obtain a plurality of the first powers; and (E) determining a first target parameter corresponding to a largest power of the first powers.

According to the present invention, the method and the circuit for calibrating wireless transceivers can improve the flatness of the wireless transceivers. In comparison with the traditional technology, after calibration of wireless transceivers by using the technology provided in the present invention, there will be no problems of circuit saturation and poor linearity.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a method and a circuit for calibrating wireless transceivers. On account of that some or all elements of the wireless transceiver could be known, the detail of such elements is omitted provided that such detail has little to do with the features of this disclosure, and that this omission nowhere dissatisfies the specification and enablement requirements. Some or all of the processes of the method of calibrating wireless transceivers may be implemented by software and/or firmware, and can be performed by the calibration circuit or its equivalent. A person having ordinary skill in the art can choose components or steps equivalent to those described in this specification to carry out the present invention, which means that the scope of this invention is not limited to the embodiments in the specification.

Figure 1:
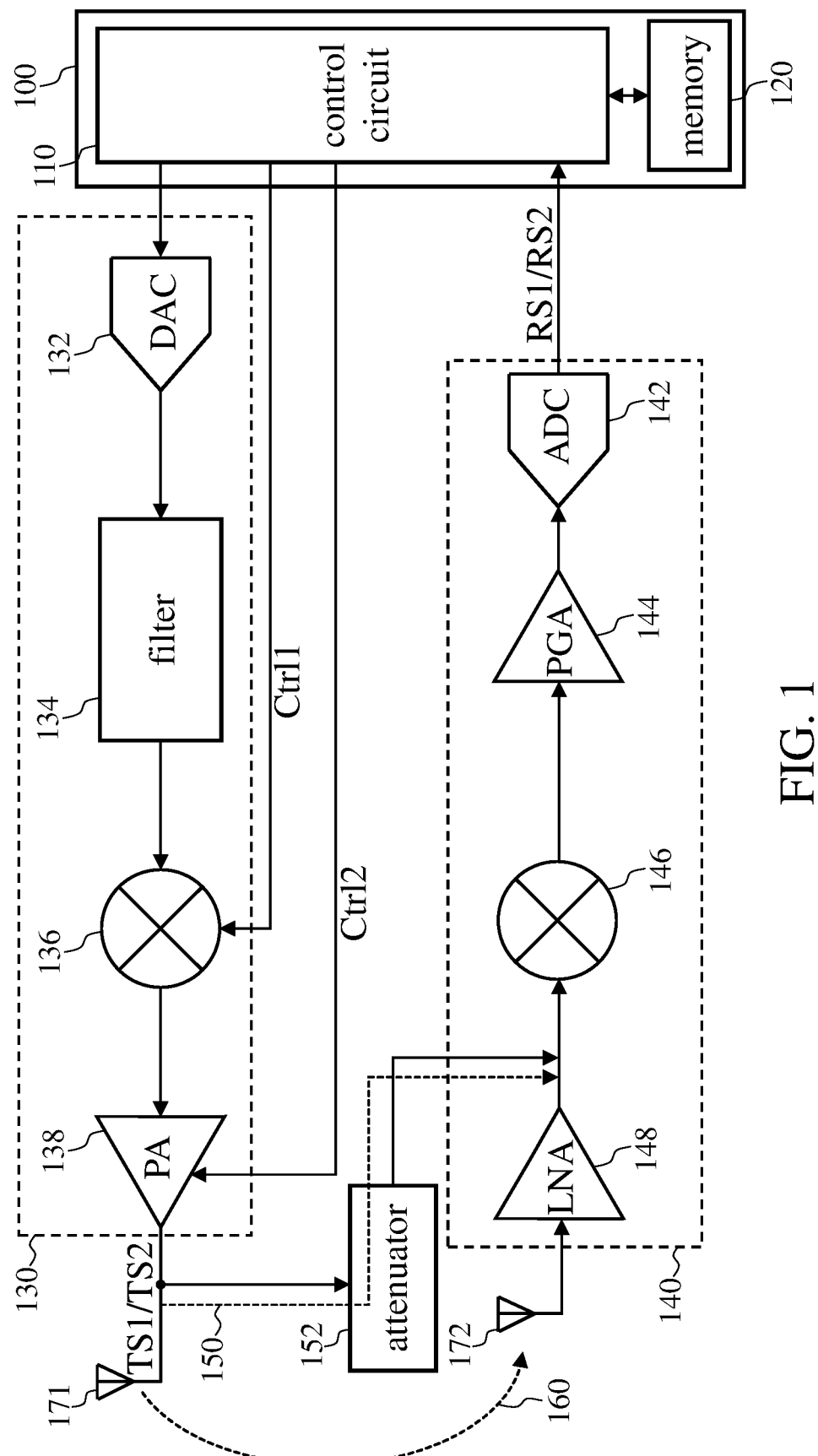
FIG. 1 illustrates a functional block diagram of the wireless transceiver and the calibration circuit therefor according to an embodiment of the present invention.

FIG. 1 is a functional block diagram of the wireless transceiver and the circuit for calibrating the wireless transceiver according to an embodiment of the present invention. The calibration circuit 100 includes a control circuit 110 and a memory 120. The wireless transceiver includes a transmission path 130 and a reception path 140. The transmission path 130 is coupled to the antenna 171, and the reception path 140 is coupled to the antenna 172. The wireless transceiver transmits an output signal through the transmission path 130 (transmitting via the antenna 171) and receives an input signal through the reception path 140 (receiving via the antenna 172). The transmission path 130 includes a digital-to-analog converter (DAC) 132, a filter 134, a mixer 136, and a power amplifier (PA) 138. The reception path 140 includes an analog-to-digital converter (ADC) 142, a programmable gain amplifier (PGA) 144, a mixer 146, and a low-noise amplifier (LNA) 148. The operation principles of the wireless transceiver and the functions of each component are well known to people having ordinary skill in the art, and the details are thus omitted for brevity. The mixer 136 and the PA 138 each include an LC tank circuit, and the inductance and/or capacitance of the LC tank circuit are/is adjustable.

Figure 2:
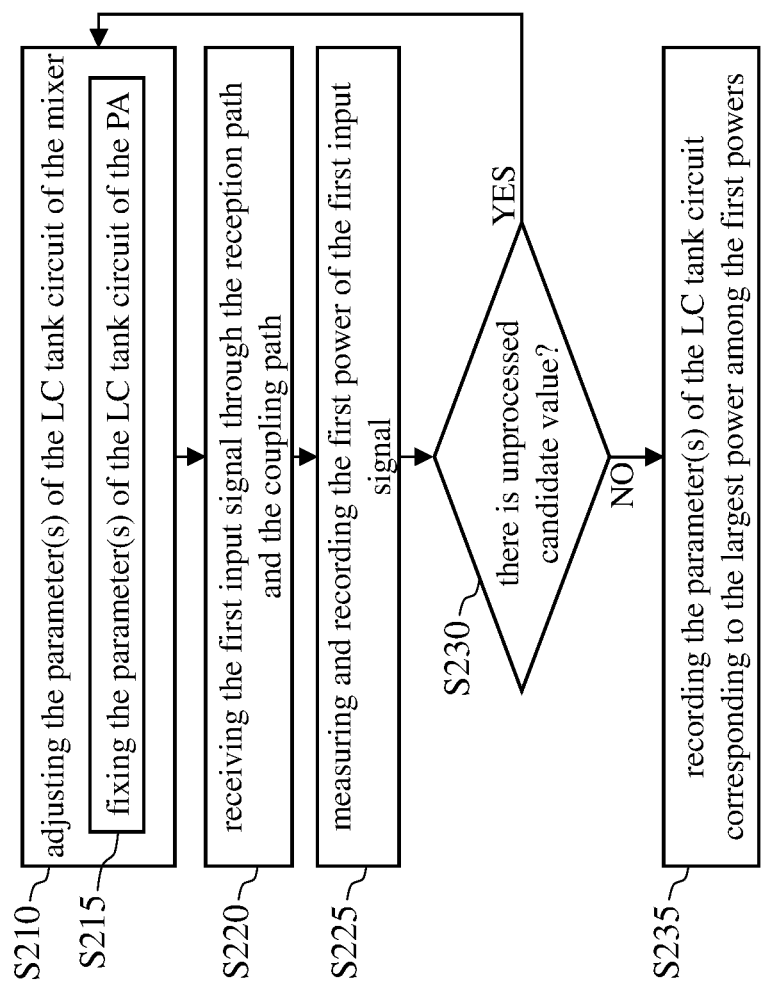
FIG. 2 illustrates a flowchart of the method of calibrating wireless transceivers according to an embodiment of the present invention.

FIG. 2 is a flowchart of the method of calibrating wireless transceivers according to an embodiment of the present invention. Reference is made to both FIG. 1 and FIG. 2 for the following discussions.

Step S210: The control circuit 110 adjusts the parameter(s) of the LC tank circuit of the mixer 136 through the control signal Ctrl1. The parameter(s) is/are the inductance and capacitance of the LC tank circuit. The adjustment of the parameter(s) of the LC tank circuit can be the adjustment of the inductance and/or capacitance of the LC tank circuit. In some embodiments, multiple candidate values are stored in the memory 120, and the control circuit 110 selects one candidate value at a time to set the parameter(s) of the LC tank circuit. A candidate value corresponds to a combination of the inductance and the capacitance. Step S210 includes sub-step S215: The control circuit 110 fixes the parameter(s) of the LC tank circuit of the PA 138 through the control signal Ctrl2. In other words, when adjusting the parameter(s) of the LC tank circuit of the mixer 136, the control circuit 110 keeps the parameter(s) of the LC tank circuit of the PA 138 unchanged (i.e., controls the PA 138 to operate at a fixed frequency).

Figure 4B:
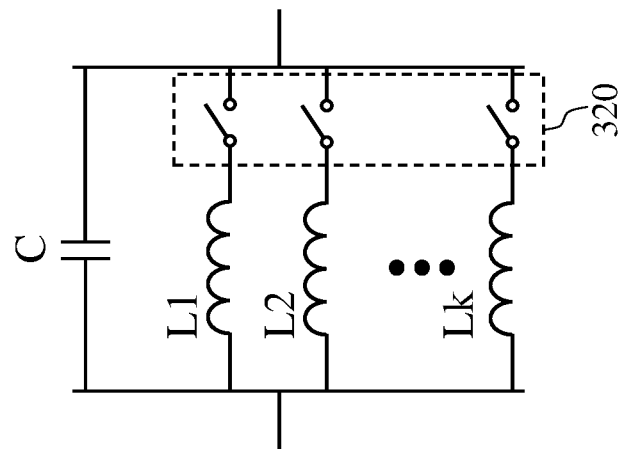
FIGS. 4A and 4B illustrate partial circuits of the LC tank circuits.
Figure 4A:
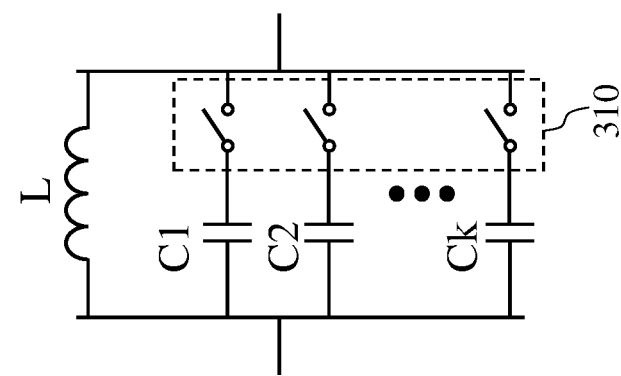

In some embodiments, the inductance of the LC tank circuit of the mixer 136 is a fixed value, and the control circuit 110 adjusts the equivalent capacitance of the LC tank circuit according to the candidate value through the control signal Ctrl1. As shown in FIG. 4A, the LC tank circuit includes an inductor L (whose inductance is a fixed value) and multiple capacitors (C1, C2, . . . , Ck, k is a positive integer greater than 1), and the control circuit 110 adjusts the equivalent capacitance of the LC tank circuit by switching multiple switches 310. In other words, a candidate value corresponds to a configuration of the switches 310 (which is equivalent to corresponding to a configuration of the capacitors).

In other embodiments, the capacitance of the LC tank circuit of the mixer 136 is a fixed value, and the control circuit 110 adjusts the equivalent inductance of the LC tank circuit according to the candidate value through the control signal Ctrl1. As shown in FIG. 4B, the LC tank circuit includes a capacitor C (whose capacitance is a fixed value) and multiple inductors (L1, L2, . . . , Lk). The control circuit 110 adjusts the equivalent inductance of the LC tank circuit by switching multiple switches 320. In other words, a candidate value corresponds to a configuration of the switches 320 (which is equivalent to corresponding to a configuration of the inductors).

The frequency response of the first output signal TS1 transmitted through the transmission path 130 changes in response to the change of the parameter(s) of the LC tank circuit of the mixer 136.

Step S220: The control circuit 110 receives the first input signal RS1 through the reception path 140 and the coupling path 150 or the coupling path 160. The coupling path 150, which is a wired path inside the wireless transceiver, is coupled between the output terminal of the PA 138 and the input terminal of the mixer 146. In other words, the first output signal TS1 is coupled or inputted to the mixer 146 through the coupling path 150. The coupling path 150 includes an attenuator 152, which is used to attenuate the first output signal TS1 to prevent the signal inputted to the mixer 146 from being too large in power. When the control circuit 110 receives the first input signal RS1 through the coupling path 150, the control circuit 110 controls the input terminal of the LNA 148 to be grounded and/or disables the LNA 148. The coupling path 160 is a wireless path, namely, the wireless transmission between the antenna 171 and the antenna 172.

Step S225: The control circuit 110 measures and records the first power of the first input signal RS1. Measuring the power of a signal in the digital domain is well known to people having ordinary skill in the art, and the details are thus omitted for brevity. The control circuit 110 records the measured first power and the parameter(s) (i.e., the current candidate value) corresponding to the first power.

Step S230: The control circuit 110 determines whether there is unprocessed candidate value in the memory 120. If there is an unprocessed candidate value (YES branch of step S230), the control circuit 110 selects another candidate value and performs step S210, step S220, step S225, and step S230 again. When there is no unprocessed candidate value (NO branch of step S230), it means that the calibration of the mixer 136 has finished.

Step S235: The control circuit 110 determines a peak power (the largest power) among the first powers and records the parameter(s) (hereinafter referred to as the first target parameter(s)) of the LC tank circuit corresponding to the largest first power. The first target parameter(s) is/are the preferable or ideal capacitance and inductance of the LC tank circuit of the mixer 136. When the LC tank circuit of the mixer 136 is set using the first target parameter(s), the output power of the mixer 136 is relatively large (larger than the output powers corresponding to other parameters).

Figure 3:
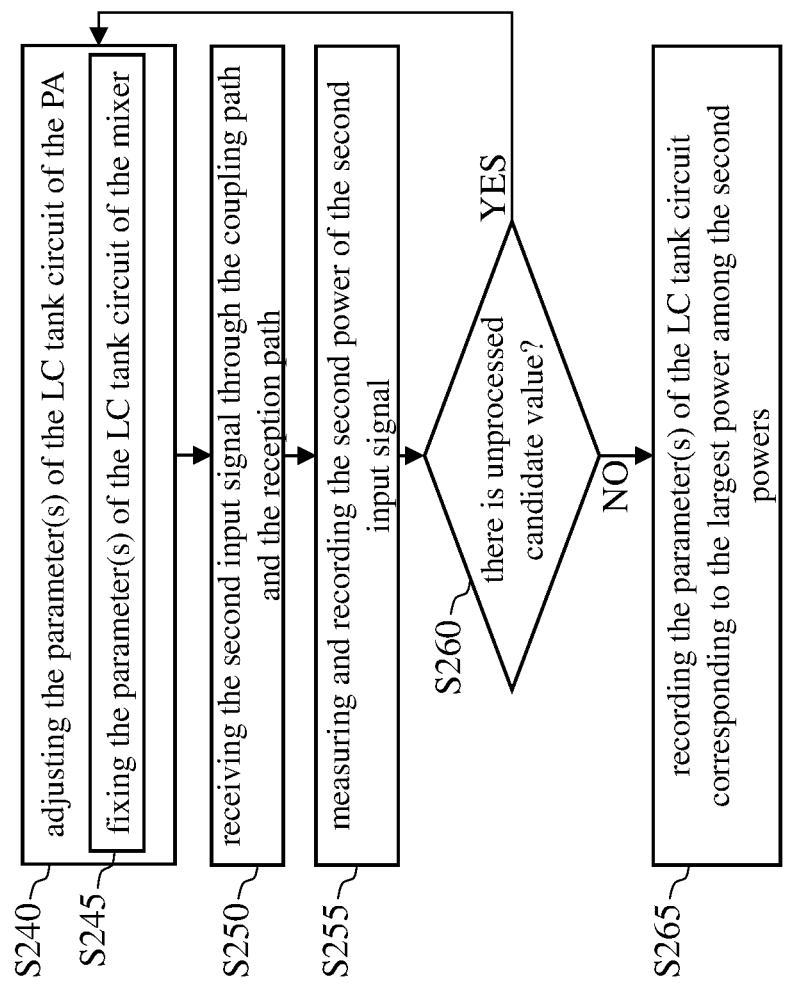
FIG. 3 illustrates a flowchart of the method of calibrating wireless transceivers according to another embodiment of the present invention.

FIG. 3 is a flowchart of the method of calibrating wireless transceivers according to another embodiment of the present invention. Reference is made to both FIG. 1 and FIG. 3 for the following discussions.

Step S240: The control circuit 110 adjusts the parameter(s) of the LC tank circuit of the PA 138 through the control signal Ctrl2. In some embodiments, the inductance of the LC tank circuit of the PA 138 is a fixed value, and the control circuit 110 adjusts the equivalent capacitance of the LC tank circuit according to the candidate value through the control signal Ctrl2 (as shown in FIG. 4A). In other embodiments, the capacitance of the LC tank circuit of the PA 138 is a fixed value, and the control circuit 110 adjusts the equivalent inductance of the LC tank circuit according to the candidate value through the control signal Ctrl2 (as shown in FIG. 4B). The frequency response of the second output signal TS2 transmitted through the transmission path 130 changes in response to the change of the parameter(s) of the PA 138. Step S240 includes sub-step S245: The control circuit 110 fixes the parameter(s) of the LC tank circuit of the mixer 136 through the control signal Ctrl1. In other words, when adjusting the parameter(s) of the LC tank circuit of the PA 138, the control circuit 110 keeps the parameter(s) of the LC tank circuit of the mixer 136 unchanged (i.e., controls the mixer 136 to operate at a fixed frequency).

In some embodiments, the PA 138 is a multi-stage amplifier which includes a power amplifier driver (PAD), and, in step S240, the control circuit 110 adjusts the parameter(s) of the LC tank circuit of any stage.

Step S250: The control circuit 110 receives the second input signal RS2 through the reception path 140 and the coupling path 150 or the coupling path 160.

Step S255: The control circuit 110 measures and records the second power of the second input signal RS2. The control circuit 110 records the measured second power and the parameter(s) (i.e., the current candidate value) corresponding to the second power.

Step S260: The control circuit 110 determines whether there is unprocessed candidate value in the memory 120. If there is an unprocessed candidate value (YES branch of step S260), the control circuit 110 selects another candidate value and performs step S240, step S250, step S255, and step S260 again. When there is no unprocessed candidate value (NO branch of step S260), it means that the calibration of the PA 138 has finished.

Step S265: The control circuit 110 determines a peak power among the second powers and records the parameter(s) (hereinafter referred to as the second target parameter(s)) of the LC tank circuit corresponding to the largest second power. The second target parameter(s) is/are the preferable or ideal capacitance and inductance of the LC tank circuit of the PA 138. When the parameter(s) of the LC tank circuit of the PA 138 is/are set using the second target parameter(s), the output power of the PA 138 is relatively large (larger than the output powers corresponding to other parameters).

In some embodiments, the control circuit 110 calibrates only the mixer 136 (i.e., performs only the flow of FIG. 2) or calibrates only the PA 138 (i.e., performs only the flow of FIG. 3).

In other embodiments, the control circuit 110 calibrates both the mixer 136 and the PA 138 (i.e., performs both the flow of FIG. 2 and the flow of FIG. 3). The control circuit 110 may first calibrate the mixer 136 and then the PA 138 (i.e., perform the flow of FIG. 2 and then the flow of FIG. 3), or may first calibrate the PA 138 and then the mixer 136 (i.e., perform the flow of FIG. 3 then the flow of FIG. 2).

Figure 5:
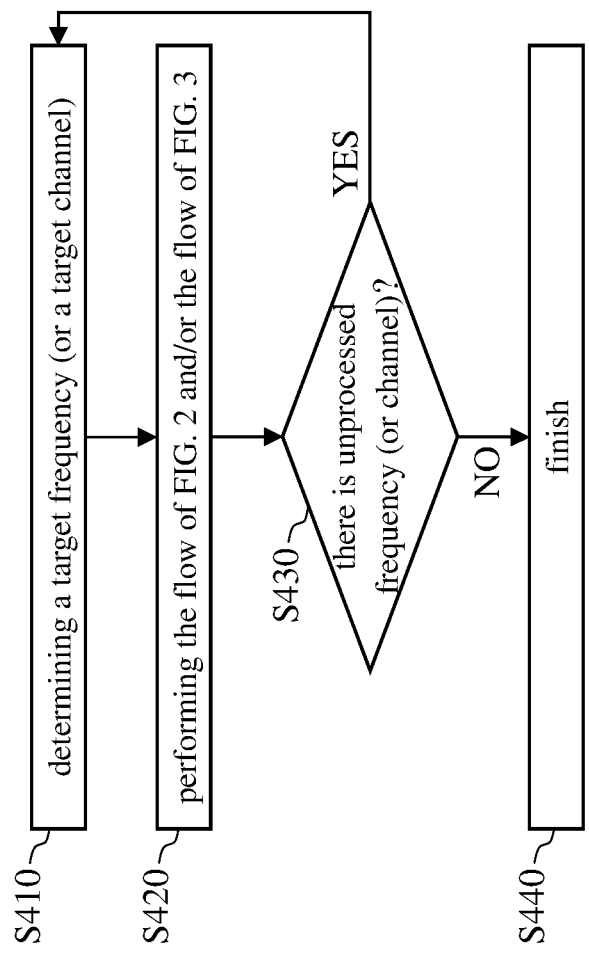
FIG. 5 illustrates a flowchart of the method of calibrating wireless transceivers for multiple frequencies (or channels) according to an embodiment of the present invention.

The flows of FIG. 2 and FIG. 3 are for the calibration targeting a certain frequency (or channel). Reference is made to FIG. 5 which is a flowchart of the method of calibrating the wireless transceiver for multiple frequencies (or channels).

Step S410: The control circuit 110 determines a target frequency (or a target channel) from the candidate frequencies (or channels). The candidate frequencies (or channels) can be stored in the memory 120. After determining the target frequency, the control circuit 110 generates the first output signal TS1 or the second output signal TS2 corresponding to the target frequency (or the target channel). The frequency of the output signal is, for example, equal to or approximately equal to the target frequency.

Step S420: The control circuit 110 performs the flow of FIG. 2 and/or the flow of FIG. 3 to determine the first target parameter(s) and/or the second target parameter(s) corresponding to the target frequency (or the target channel).

Step S430: The control circuit 110 determines whether there is unprocessed frequency (or channel). If so, the flow goes back to step S410 to determine the next frequency (or channel); if not, the calibration finishes (step S440).

After the flow of FIG. 5 has finished, the first target parameter(s) and/or the second target parameter(s) for the wireless transceiver for multiple frequencies (or channels) are obtained. In practical operations, the control circuit 110 can thus determine the corresponding first target parameter(s) and/or second target parameter(s) according to the operating frequency (or channel) of the wireless transceiver, and use the first target parameter(s) and/or second target parameter(s) to set the mixer 136 and/or the PA 138, respectively, so that the output power(s) of the mixer 136 and/or the PA 138 is/are more ideal (i.e., closer to the design value). As a result, the output power of the wireless transceiver becomes less susceptible to the manufacturing process. In other words, the calibrated wireless transceiver has an improved flatness.

The control circuit 110 may be a circuit or an electronic component with program execution capability, such as a central processing unit (CPU), a microprocessor, or a microprocessing unit. The control circuit 110 executes the program codes or program instructions stored in the memory 120 to perform the steps of FIG. 2, FIG. 3, and FIG. 5. In other embodiments, people having ordinary skill in the art can design the control circuit 110 based on the above disclosure. That is to say, the control circuit 110 can be an application-specific integrated circuit (ASIC) or embodied by circuits or hardware such as programmable logic device (PLD).

Since a person having ordinary skill in the art can appreciate the implementation detail and the modification thereto of the present method invention through the disclosure of the device invention, repeated and redundant description is thus omitted. Please note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method of calibrating a wireless transceiver comprising a transmission path and a reception path, the transmission path comprising a mixer and a power amplifier, the method comprising:
   (A) adjusting a first parameter of a first LC tank circuit of the mixer;
   (B) receiving a first input signal through a coupling path and the reception path;
   (C) measuring a first power of the first input signal;
   (D) repeating steps (A) to (C) to obtain a plurality of the first powers;
   (E) determining a first target parameter corresponding to a largest power of the first powers;
   (F) adjusting a second parameter of a second LC tank circuit of the power amplifier;
   (G) receiving a second input signal through the coupling path and the reception path;
   (H) measuring a second power of the second input signal;
   (I) repeating steps (F) to (H) to obtain a plurality of the second powers; and
   (J) determining a second target parameter corresponding to a largest power of the second powers.

2. The method of claim 1, wherein the coupling path is coupled between the transmission path and the reception path and comprises an attenuator.

3. The method of claim 1, wherein the transmission path is coupled to a first antenna, the reception path is coupled to a second antenna, and the coupling path is wireless transmission between the first antenna and the second antenna.

4. The method of claim 1 further comprising:
fixing the second parameter of the second LC tank circuit of the power amplifier when step (A) is being performed.

5. The method of claim 1 further comprising:
fixing the first parameter of the first LC tank circuit of the mixer when step (F) is being performed.

6. The method of claim 1 further comprising:
performing steps (A) to (J) for a plurality of frequencies to obtain the first target parameter and the second target parameter for each frequency.

7. The method of claim 1, wherein the first LC tank circuit comprises a first inductor and a plurality of first capacitors, the second LC tank circuit comprises a second inductor and a plurality of second capacitors, and step (A) and step (F) change a configuration of the first capacitors and a configuration of the second capacitors, respectively.

8. The method of claim 1, wherein the first LC tank circuit comprises a first capacitor and a plurality of first inductors, the second LC tank circuit comprises a second capacitor and a plurality of second inductors, and step (A) and step (F) change a configuration of the first inductors and a configuration of the second inductors, respectively.

9. A circuit for calibrating a wireless transceiver comprising a transmission path and a reception path, the transmission path comprising a mixer and a power amplifier, the circuit comprising:
a memory; and
a control circuit, coupled to the memory and configured to perform following steps:
(A) adjusting a first parameter of a first LC tank circuit of the mixer;
(B) receiving a first input signal through a coupling path and the reception path;
(C) measuring a first power of the first input signal;
(D) repeating steps (A) to (C) to obtain a plurality of the first powers;
(E) determining a first target parameter corresponding to a largest power of the first powers;
(F) adjusting a second parameter of a second LC tank circuit of the power amplifier;
(G) receiving a second input signal through the coupling path and the reception path;
(H) measuring a second power of the second input signal;
(I) repeating steps (F) to (H) to obtain a plurality of the second powers; and
(J) determining a second target parameter corresponding to a largest power of the second powers.

10. The circuit of claim 9, wherein the coupling path is coupled between the transmission path and the reception path and comprises an attenuator.

11. The circuit of claim 9, wherein the transmission path is coupled to a first antenna, the reception path is coupled to a second antenna, and the coupling path is wireless transmission between the first antenna and the second antenna.

12. The circuit of claim 9, wherein the control circuit further performs following steps:
fixing the second parameter of the second LC tank circuit of the power amplifier when performing step (A).

13. The circuit of claim 9, wherein the control circuit further performs following steps:
fixing the first parameter of the first LC tank circuit of the mixer when performing step (F).

14. The circuit of claim 9, wherein the control circuit further performs following steps:
performing steps (A) to (J) for a plurality of frequencies to obtain the first target parameter and the second target parameter for each frequency.

15. The circuit of claim 9, wherein the first LC tank circuit comprises a first inductor and a plurality of first capacitors, the second LC tank circuit comprises a second inductor and a plurality of second capacitors, and step (A) and step (F) change a configuration of the first capacitors and a configuration of the second capacitors, respectively.

16. The circuit of claim 9, wherein the first LC tank circuit comprises a first capacitor and a plurality of first inductors, the second LC tank circuit comprises a second capacitor and a plurality of second inductors, and step (A) and step (F) change a configuration of the first inductors and a configuration of the second inductors, respectively.

* * * * *